United States Patent

[11] 3,573,734

[72] Inventors Winston F. Williams; David F. Keese, Cedar Rapids, Iowa

[21] Appl. No. 814,779

[22] Filed Apr. 9, 1969

[45] Patented Apr. 6, 1971

[73] Assignee Collins Radio Company Cedar Rapids, Iowa

[54] SOLID STATE TOUCH-TUNE SYSTEM
10 Claims, 4 Drawing Figs.

[52] U.S. Cl. .......... 340/168, 325/455R

[51] Int. Cl. .......... G01r 23/10, H03b 3/04, H03k 21/18

[50] Field of Search .......... 340/168, 163, 147; 325/470, 455, 363, 391; 334/7, 8, 31; 235/150.3, 152, 92 (57)

[56] References Cited

UNITED STATES PATENTS

| | | | |
|---|---|---|---|
| 3,244,983 | 4/1966 | Ertman .......... | 325/455 |
| 3,492,423 | 4/1970 | Basse .......... | 325/455X |
| 3,509,484 | 1/1970 | Schilling .......... | 340/168X |

*Primary Examiner*—Donald J. Yusko
*Attorneys*—Richard W. Anderson and Robert J. Crawford

ABSTRACT: Remote tuning system for a plurality of electronic services employs a common tuning control, function selector, and indicator. Tuning is accomplished by selectively applying pulses of variable repetition rate to electronic counter and code converting means the output of which causes a selected electronic service to be step-tuned at a rate determined by repetition rate of the oscillator.

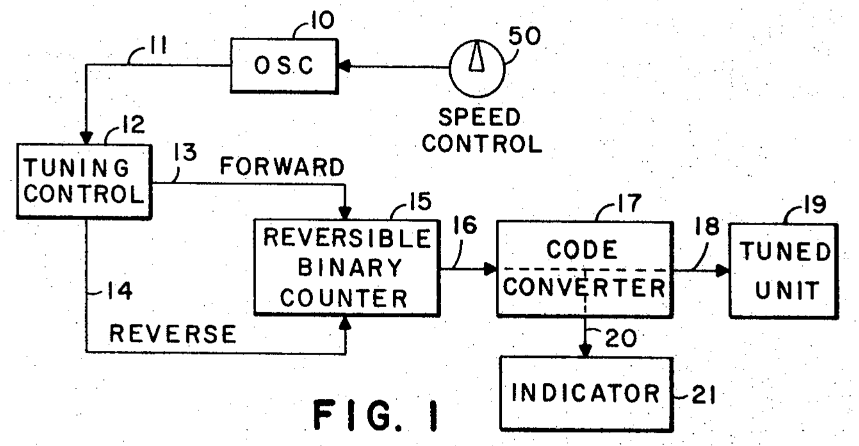
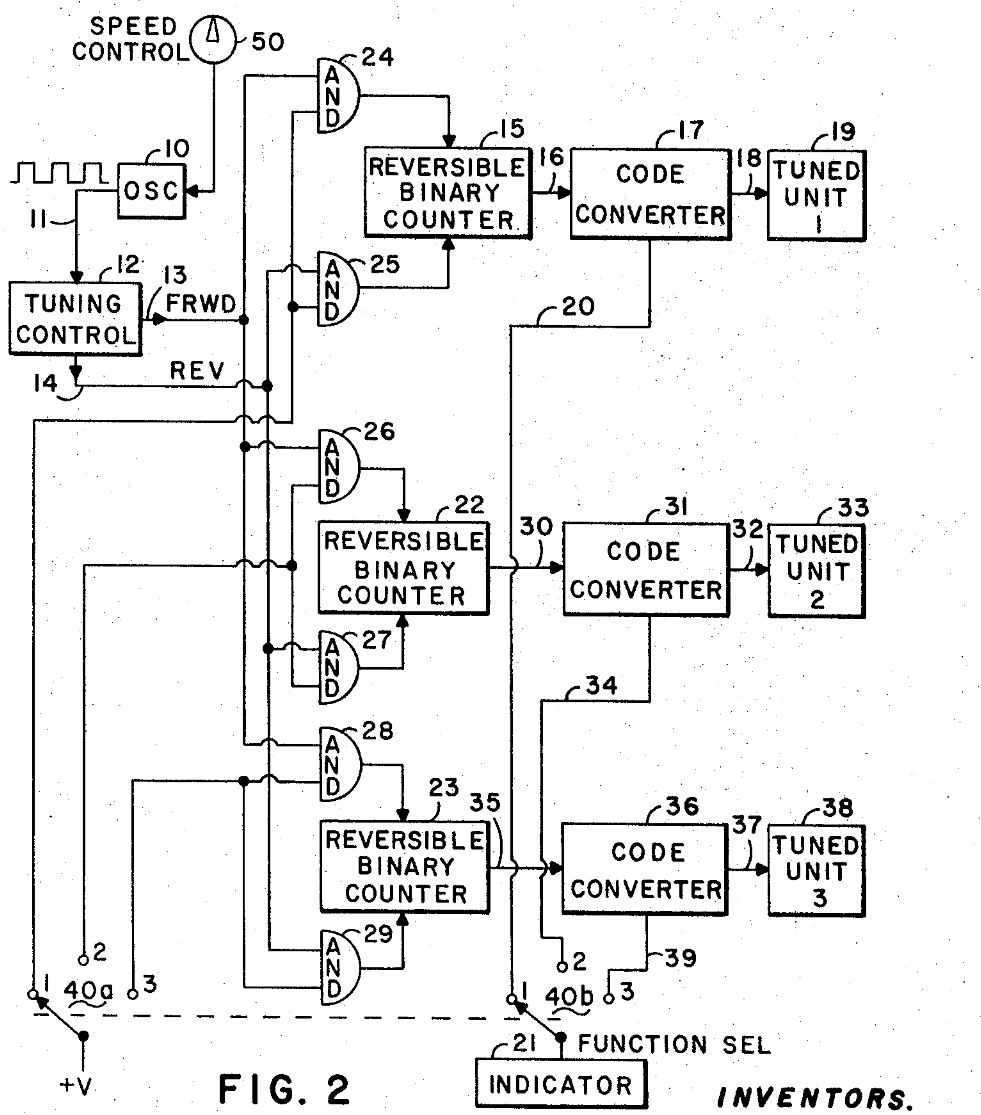
INVENTORS.
WINSTON F. WILLIAMS
DAVID F. KEESE
BY Richard W Anderson
AGENT INVENTORS.
WINSTON F. WILLIAMS
DAVID F. KEESE
BY Richard W. Anderson
AGENT

SOLID STATE TOUCH-TUNE SYSTEM

This invention relates generally to remote tuning control and more particularly to remotely tuning one or a plurality of controlled or tuned units by means of a tuning control and indicator means which may be remotely located from the switching and logic means necessary to selectively control the tuned unit.

The present invention is particularly useful in remotely controlling a plurality of electronic services each of which is adapted to be step-tuned over a particular range of frequencies or selectively tuned to a plurality of preselected channels. The present invention is thus related objectwise to the subject matter of a concurrently filed, Ser. No. 814,766, entitled "Tuning Control System" by Winston F. Williams, assigned to the assignee of the present invention.

In basic philosophy, the primary object thereof of the present invention is the elimination of confusion experienced by an operator, such as the pilot of an aircraft, who is confronted with the task of selecting one of a plurality of available electronic services and in turn tuning the selected one of the services to a desired frequency or tuned condition such as a given channel.

Two main advantages are presented by the tuning system of the present invention. The first advantage is an inherent reduction in the display and control space which need be accessible to the operator in order to selectively control a number of electronic services, each of which might be remotely located from the operator's position. The pilot of an aircraft in particular is confronted with a myriad of indicators, dials, meters, etc. which impose a great demand on his attention. In known airborne installations, each electronic service carried on the aircraft generally necessitates a selector control on the instrument panel along with an indicator to indicate to the pilot the tuned channel or frequency of the device and situation. In addition to the confusion presented to the pilot, numerous indicator readouts, switches, etc. too often place a demand for instrument panel space which cannot be tolerated in a given type of aircraft. For example, the small single and two-passenger multipurpose military aircraft may carry a profusion of electronic services and yet, provide a bare minimum of allocated instrument panel and cockpit space for the installation of the necessary controls to select and tune the services. It is accordingly an object of the present invention to tend to provide a remote tuning system for the plurality of electronic services employing a single indicator which is visible to the operator but need not be within the operator's reach.

A further object of the present invention is to provide a remote tuning control system by incorporating a common tuning control for a plurality of electronic services where the tuning control need only be within reach of the operator but not necessarily directly viewable by the operator. In this regard the present invention incorporates the well-known expedient of touch-tuning by means of which electronic equipment is selectively stepped to a plurality of tuned conditions by the depression of a tuning control switch in a forward and reverse fashion, while the tuned condition of the unit is monitored on an indicator viewable by the operator.

A further object of the present invention is to provide a completely electronic remote control system to effect the tuning of a plurality of electronic services wherein a single indicator is employed in conjunction with a single selector switch and tuning control means wherein only the function selector indicator and tuning control may be accessible to the pilot and all necessary switching devices, as well as the electronic services, per se, may be remotely installed wherever space allocations permit.

These and other objects and features will become apparent by reading the following description with reference to the accompanying drawings in which:

FIG. 1 is a functional diagram of a basic tuning system;

FIG. 2 is a functional schematic diagram of a system employing a plurality of remotely tuned electronic services in conjunction with a single indicator and tuning control;

Figures 3, 4:
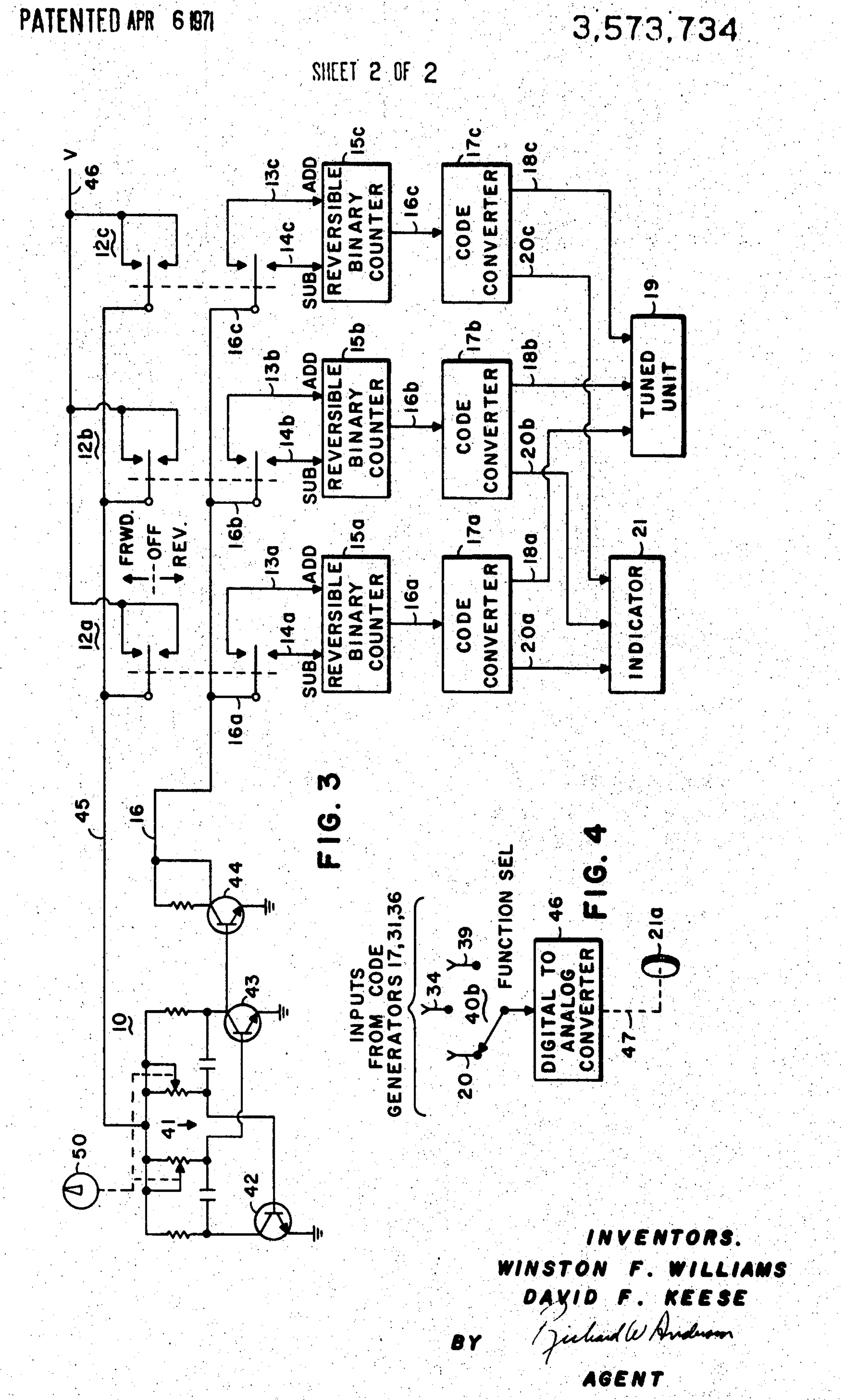
FIG. 3 is a functional schematic diagram illustrating schematic details of selected portions of the system of FIGS. 1 and 2.
FIG. 4 is a functional diagram illustrating further implementation of the common indicator employment scheme.

With reference to FIG. 1, the basic system comprises an oscillator 10 which provides a train of output pulses of predetermined repetition rate to a line 11 to a tuning control 12. The rate may be determined by setting the speed control 50. As will be further described, the tuning control 12 is basically a switching system by means of which the train of pulse 11 from oscillator 10 may be selectively applied on line 13 or 14 as respective inputs to a reversible binary counting means 15. Thus, the tuning control 12 is effective in applying the train of the pulses 11 to either the "forward" or "reverse" lines 13 and 14 associated with the counting means 15. The application of pulses, as will be further described, is applied on a demand basis such as by depression of a switch in a given position. In response to switching means in tuning control 12 being activated, the reversible binary counter 15 either advances or backs up by one count for each pulse applied from the oscillator 10. The output 16 from the binary counter 15 is thus a plurality or bundle of lines each of which carries the binary state of a particular stage of the binary counter. As is well known in the art, the stages of a binary counter collectively provide an output corresponding to the binary representation of the number of input pulses that have been applied to the counter.

The output 16 from the binary counter 15 is indicated as being applied to a code converter 17. Code converter 17 provides a first output 18 to a tuned unit or electronic service 19 and a second output 20 to an indicator means 21.

It should now be emphasized that, in accordance with the present invention, the function of the code converter 17 is optional in nature; that is to say, the tuned unit 19 as well as the indicator 21 might well be adapted to be responsive to a binary code input, per se, to step-tune to successive frequencies in response to the count existing in the counter 15. This flexibility is illustrated functionally in FIG. 1 by including a phantom interconnection illustrating optional direct connection between the counter 15 and either, or both, of the tuned unit 19 and the indicator 21.

The code converter function 17 of the system will not be described in detail, it being realized that any number of state-of-the-art approaches might be incorporated to convert the pure binary code from the counter 15 into any desirable binary type of code for control of the tuned unit 19 and for corresponding presentation on the indicator 21. Further, it is to be realized that the code converter means 17 might employ a discreetly different code conversion for the tuned unit as opposed to the indicator 21. Further, in any given system, the tuned unit 19 might respond directly to the binary counter 15 while the indicator might respond to a particular code conversion of the output of the binary counter and vice versa. Numerous expedients in the code conversion art may be employed. Numerous tuning code arrangements considered well within the grasp of one skilled in the art may be employed along with appropriate code conversion. For example, a tuned unit might respond to a binary-code-decimal input code or might respond to a grounded pair permutation scheme. The tuned unit might by way of further example respond to a reverse binary or binary complement code. In any event, the tuned unit, as well as the indicator, in accordance with the present invention may be functionally and operably interconnected into the system by means of including appropriate code conversion or code generation within the block 17 of FIG. 1.

FIG. 2 illustrates an expansion of the basic arrangement of FIG. 1 wherein a plurality of tuned units are shown in a system incorporating the oscillator 10 and tuning control 12 arrangement, along with a function selector which controls enabling logic to effect an operable arrangement between a selected one of the tuned units, the common tuning control 12, and the common indicator 21.

FIG. 2, incorporating like reference numerals as concerns like functions of the basic system of FIG. 1, illustrates the oscillator 10 as being connected to the tuning control 12 to selectively apply the train of oscillator pulses 11 on line 13 or 14 through AND gating functions to one of a plurality of reversible binary counting means each of which is associated with a particular one of the tuned units. Three remotely controlled tuned units are shown; it being understood that the arrangement obviously extends to the incorporation of any number of remotely tuned units. The forward and reverse control lines 13 and 14 of FIG. 2 are indicated as being applied as respective first inputs to a pair of AND gates associated with each of the binary counters. Line 13 is applied as the first input to AND gates 24, 26 and 28 which respectively control the application of "forward" input pulses from line 13 to the associated reversible counters 15, 22 and 23 in the presence of an enabling second input to the AND gates from function selector switch 40*a*. As indicated, switch 40*a* is in position 1 which applies a positive voltage as second inputs to the AND gates 24 and 25 associated with binary counter 15. No such enabling input is seen to be applied to the AND gate pairs associated with counters 22 and 23 of the non-selected tuned units 2 and 3. As indicated, the pulses from oscillator 10, with the function selector 40*a* in position 1, are applied through lines 13 or 14 as selected by the operator through AND gates 24 or 25 to counter 15. The counter either advances or backs up by one count in response to each input pulse applied. The rate at which the counter advances or backs up is defined by the pulse repetition rate of the pulse train from the oscillator 10, and is selectable by speed control 50.

Function selector switch section 40*a* in its successive positions 2 and 3 is seen to likewise enable the application of pulses from the forward and reverse lines 13 and 14 to counters 22 or 23. The counter which is not receiving input pulses at any particular time remains at its last count. The outputs 16, 30 and 35 from the respective counters 15, 22 and 23 are applied to associated code converting means 17, 31 and 36. The outputs 20, 34 and 39 from the code converters are applied to a further section 40*b* of the function selector switch for selective application to the common indicator 21.

The system in FIG. 2 illustrates that the operator, in selecting functions 1, 2 or 3, effects an operable interconnection between one of the three tune units 19, 33 or 38 and the tuning control output lines 13 and 14 such that its associated binary counter advances or backs up in count under control of the tuning control 12, while the associated code converter provides the input to the common indicator 21. Operation of the switches within tuning control 12 is thus ineffective in changing the particular count in those counters associated with the unselected ones of the remotely tuned units. Upon switching back to a previously selected tuned unit is then apparent that the indicator is connected to the code converter associated with the newly selected unit and responsive to the particular count in the newly selected counter to indicate the last existing tuned condition of the newly selected unit.

FIG. 3 illustrates schematically an embodiment of the pulse generator or oscillator 10 in addition to a switching embodiment which might be employed in the tuning control 12. In addition, FIG. 3 illustrates an expansion of the remote tuning principle as it might be applied to one of the plurality of tuned units. For example, the tuned unit 19 might itself be controlled by three binary counters each one of which is instrumental in establishing a particular digit of the tuning response; that is to say, a first counter under the control of a first section of the tuning control switch might be instrumental in tuning the tuned unit in "hundreds" steps while a second counter might be instrumental in stepping the tuned condition of the tuned unit 19 in "tens" steps, and a third binary counter might be instrumental in tuning the unit 19 in "units" steps.

The oscillator 10 is embodied in FIG. 3 as comprising first and second transistors 42 and 43 arranged in a relaxation oscillator circuit 41 by means of which a square-wave output or series of pulses is obtained. The output from the stage 43 of oscillator 10 is applied to a buffer amplifier 44 which is a driver amplifier for the plurality of binary counters employed in the system. Speed control 50 is illustrated as a means for varying the RC time constants in the cross-coupling networks between stages 42 and 43—thus to determine the frequency of operation.

The tuning control 12 employs three switch sections, 12*a*, 12*b* and 12*c*, each of which may selectively apply the train of pulses 16 from the driver amplifier 44 to the "forward" and "reverse" inputs of the reversible counters. It should be emphasized that the arrangement of FIG. 3 in essence illustrates the single binary counter 15 of FIG. 1 as being comprised of three counters, 15*a*, 15*b* and 15*c*. Switch section 12*a* of the tuning control 12 controls the count in counter 15*a*, switch section 12*b* controls the count in counter 15*b*, switch section 12*c* controls the count in counter 15*c*. The outputs 16*a*, 16*b* and 16*c* of the counters 12*a*, 15*b* and 15*c* are applied through interconnections 16*a*, 16*b* and 16*c* to respective code converters, 17*a*, 17*b* and 17*c*. Outputs 20*a*, 20*b* and 20*c* from the code converters are applied to the common indicator 21 to respectively control digits of the indication presented by the indicator 21; that is, control the display of the digits to which the particular converter output is representative. Outputs 18*a*, 18*b* and 18*c* from the code converters are applied to the tuned unit 19 where, as previously mentioned, each is instrumental in step-tuning the tuned unit in terms of particular significant digits which define the overall tuned condition. For example, the output 18*a* from code converter 17*a* might tune the unit 19 in steps of 100 megacycles while the output 18*b* from code converter 17*b* might tune the unit 19 in tens of megacycles, and the output 18*c* from code converter 17*c* might tune a tuned unit 19 in units. In a similar fashion, the outputs 20*a*, 20*b* and 20*c* from the three code converters would control corresponding digit readouts on the common indicator 21 such that the composite readout on the indicator corresponds to the particular tuned condition of the unit 19.

Control unit 12 might be comprised of three double-pole switches. The upper portions of each of the switch sections 12*a*, 12*b* and 12*c* apply a source of supply voltage 46 through line 45 to the oscillator 41 when any one of the three switch sections is depressed either in a "forward" or "reverse" position. This particular feature renders the oscillator 41 inoperable during such times as the system is not actually being tuned and serves to minimize any installation problems related to radiation from the oscillator should such problems be significant in, for example, an aircraft installation. It should be emphasized here that the function of the upper sections of the rocker switches 12*a*, 12*b* and 12*c* is not a necessary function as concerns the system operation. The oscillator 10 might be fully energized at all times. The lower sections of the switches 12*a*, 12*b* and 12*c* when depressed in one position or another from their neutral "off" position apply the pulses on line 16 through lines 16*a*, 16*b* or 16*c* to the system reversible binary counters to either subtract or add counts under control of the operator.

FIG. 4 illustrates a further functional relationship between the common indicator 21 and the outputs from the code converters. The outputs from the various code converters (if employed) or the outputs taken directly from the various reversible binary counters, would be digital in nature and the particular indicator 21 might operate on an analogue basis, such as, for example, the indicator 21 might comprise a plurality of digit indicating wheels as in a counter wheel assembly. In this situation the selected output from the various code converters might be applied to a digital to analogue converter 46 which provides a mechanical drive 47 to rotate a digit wheel.

The particular design characteristics of the counter, the code converter, and the manner in which various tuned units are actually tuned, is entirely flexible in accordance with the present invention. In basic function, the tuning system responds to a particular binary count being selectively effected in one of a plurality of binary counters. The count in turn is established by the operator depressing one or more of the switch sections in the tuning control 12 to cause one or more associated reversible binary counters to change in count in a step-fashion at a predetermined rate, the number of steps being in turn defined by the amount of time the particular switch in the tuning control is held in a depressed position. The operator needs only to select a particular one of the controlled units by positioning function selector switch 40 located within his reach and proceeding to tune the selected unit by depressing appropriate switches on the turning control 12 while monitoring the tuned condition of the selected tuned unit on the common indicator 21. The system thus offers a great deal of installation flexibility as to space allocation in requiring only that the indicator be viewable by the operator and the tuning control 12 and selector switch 40 be within his reach. All other portions of the control circuitry may be remotely installed. A single indicator rather than a plurality of indicators is employed. A single tuning unit which can be tuned by the touch method is employed for all electronic functions; thus, control panel space requirements are minimized, confusion to the pilot is held to a minimum, and installation flexibility is enhanced by permitting all necessary switch and code generation circuitry to be remotely installed from the operator's position.

Although this invention has been described with respect to particular embodiments thereof, it is not to be so limited as changes might be made therein which fall within the scope of the invention as defined in the appended claims.

We claim:

1. A remote tuning system comprising a controlled device, said device comprising a plurality of tuning means each of which is effective in tuning said device by controlling predetermined ones of digital tuning steps the composite of which define the tuned condition of said device, pulse generating means providing a train of output pulses of predetermined repetition rate, a plurality of reversible binary counting means each including forward and reverse input terminals, switching means comprising a plurality of independently operable switch sections each of which is connected to the output of said pulse generating means and each of which is adapted to supply the connected output from said pulse generating means selectively to the respective forward and reverse input terminals of an associated one of said plurality of reversible binary counting means, a plurality of code converting means, each of said reversible binary counting means providing a binary output to an associated one of said plurality of code converting means, said indicating means being connected to the outputs of each of said code converting means, predetermined ones of a plurality of digit displays comprising said indicator being responsive to and positioned by an associated one of said code converting means, and the outputs from each of said code converting means further providing an output to an associated code responsive one of said plurality of tuning means in said controlled device to effect a tuned condition of said device corresponding to that displayed by said indicator in discrete step intervals at a rate defined by the repetition rate of said pulse generating means.

2. A remote tuning system as defined in claim 1 wherein said switching means comprises at least one three-position switch, a first-position of said switch disconnecting the output from said pulse generating means to said binary counting means, second and third positions of said switch respectively connecting the output of said pulse generating means to the forward and reverse input terminals of said reversible binary counting means.

3. A remote tuning system as defined in claim 2 wherein said switching means includes means for enabling said pulse generating means only in those selected positions thereof that effect connections between said pulse generating means and said binary counting means.

4. A remote tuning system comprising a plurality of controlled devices, a common digital indicating means for presenting an indication of the existing one of a number of identifiable tuned states of a selected one of said controlled devices, a common control unit, function selecting means, switching means, means for generating a train of output pulses at a preselected repetition rate, a plurality of reversible binary counting means, said switching means being adaptable to selectively apply the output from said pulse generating means to forward and reverse control input terminals of that one of said reversible binary counting means associated with the selected one of said controlled devices, code converting means receiving the output from said binary counting means, a common indicator, said function selector means selectively connecting the enabled one of said code generating means to said common indicator, said common indicator being adapted to provide an indication of the tuned condition of said selected one of said controlled devices, each said controlled device including means responsive to the binary code input thereto from the associated one of said code converting means to step-tune in a direction selected by said switching means.

5. A tuning system as defined in claim 4 wherein said pulse generating means includes means to selectively adjust the pulse repetition rate of the output pulses therefrom.

6. A tuning system as defined in claim 5 wherein said common indicator comprises a plurality of positionable digit wheels, digital-to-analogue converting means associated with each of said digit wheels, each of said digital-to-analogue converting means being selectively connected to the output from one of said code converting means, the connected one of said code converting means being effected by selected positions of said function selecting means.

7. A tuning system as defined in claim 6 wherein said switching means includes means for enabling said code generating means in those respective positions thereof which effect connection of the output of said pulse generating means to said binary counting means.

8. A tuning system as defined in claim 7 including enabling means controllable by said function selecting means to effect an operable interconnection between the output of said pulse generating means and the binary counting means associated with a selected one of said controlled devices as determined by said function selecting means.

9. A tuning system as defined in claim 8 wherein each of said controlled devices comprises tuning means responsive to the binary count existing in the connected one of said binary counting means to effect sequential step-tuning at a rate defined by the pulse repetition rate of said pulse generating means.

10. A tuning system as defined in claim 9 wherein each of said binary counting means comprises a reversible decade binary counter each said counter comprising four output lines, the collective levels of which define binary numbers corresponding to the digits zero through nine, said code converting means receiving the four output lines from said binary counter and including means to convert the digit defined by the collective states of the four input lines to a predetermined code to which the connected one of said controlled devices is responsive.